March 30, 1971 A. GUMUCHIAN 3,573,169

FUEL ASSEMBLY FOR NUCLEAR REACTORS

Filed Nov. 27, 1967

United States Patent Office 3,573,169

Patented Mar. 30, 1971

1

3,573,169

FUEL ASSEMBLY FOR NUCLEAR REACTORS

André Gumuchian, Paris, France, assignor to Commissariat a l'Energe Atomique, Paris, France Filed Nov. 27, 1967, Ser. No. 685,863

Claims priority, application France, Dec. 5, 1966, 86,220

Int. Cl. G21c *3/30*

U.S. Cl. 176—78 6 Claims

ABSTRACT OF THE DISCLOSURE

A nuclear fuel assembly comprising at least one bundle of pins which are loaded with fissile material, provided with expansion chambers and disposed within a tubular box.

Figures 1, 2:
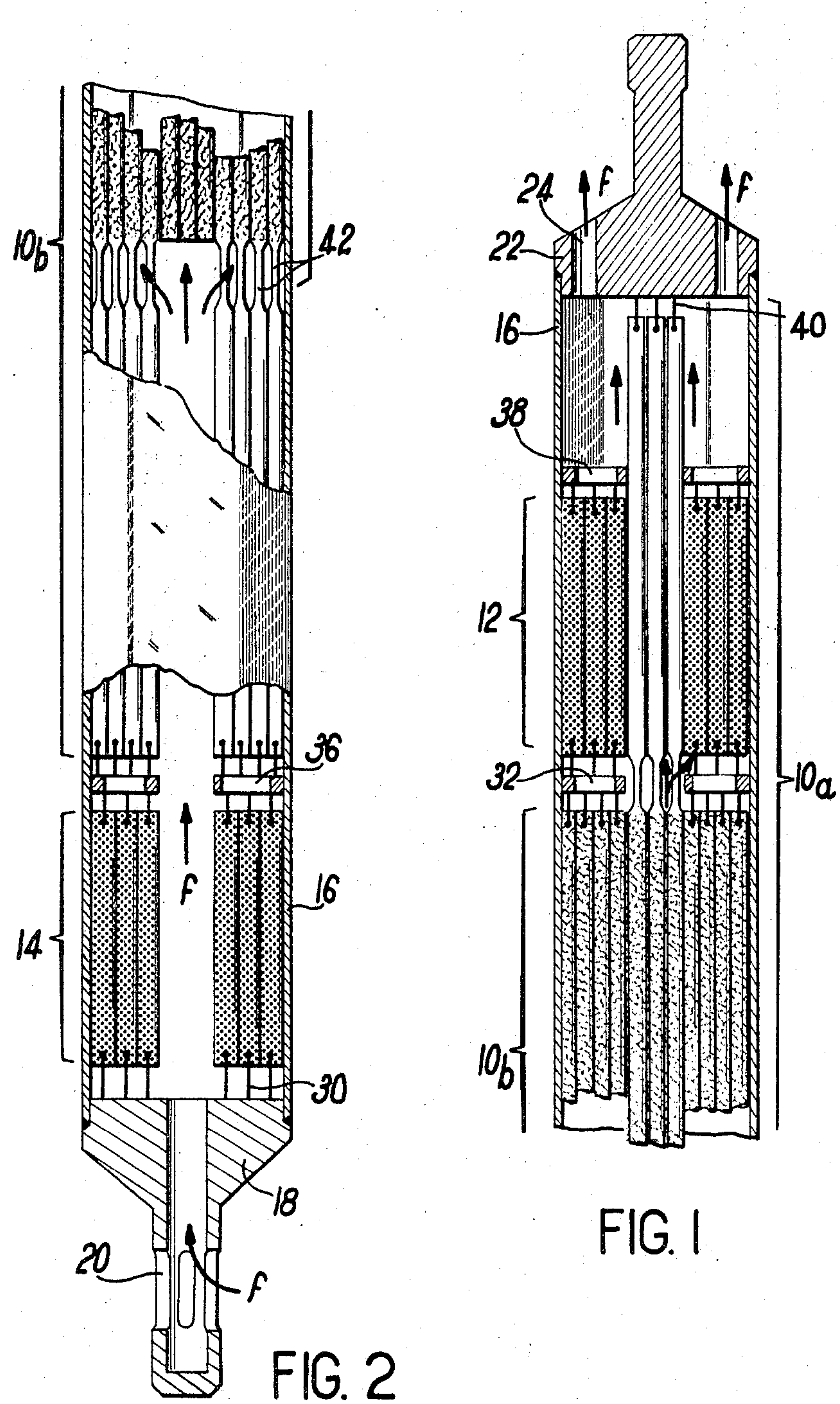

The pins are arranged in two sections so that the expansion chambers of said pins are located at opposite ends whilst those portions of said pins which are loaded with fissile material are all located at the same level.

This invention relates to fuel assemblies for nuclear reactors and more especially a fuel assembly comprising a bundle of pins loaded with fissile material and each provided with an expansion chamber, said assembly being primarily designed for use in a fast reactor which is cooled by a circulation of liquid metal.

A fuel assembly for fast reactors usually comprises on the one hand a central bundle of pins each made up of fissile material contained in a leak-tight can and placed in a tubular box which constitutes a circulation duct for the liquid metal coolant, said pins being attached to the box at one of their extremities and, on the other hand, two bundles respectively located vertically above and beneath the central bundle and constituting fertile blankets or neutron shields. Reference can be made, for example, to French Patent No. 1,291,633 as filed on Mar. 10, 1961 by Commissariat à l'Energie Atomique which describes an assembly comprising three superposed bundles of pins disposed within a box having a cross-section in the shape of a hexagon. Said box is made up of a tubular sleeve provided with a top end-fitting or lifting head and with a bottom end-fitting which is intended to engage in a diagrid, the function of said diagrid being to support all of the assemblies. The pins which form part of a bundle are disposed on a triangualr lattice, occupy practically the entire cross-sectional area of the sleeve and are carried on rails fixed to the bottom end-fitting or to the sleeve. The central bundle of pins contains fissile material and the two outer or end bundles of pins either contain fertile material or constitute a neutron shield.

Except in the case of vented fuel assemblies, the can of the pins which contain fissile material delimits, beyond a portion containing said material (usually a stack of oxide pellets), an expansion chamber which is intended to collect the fission gases. The length of said chamber can be of the same order as the portion of said pin which contains fissile material.

According to a variant which is illustrated and described on pages 84–86 of the July-August 1965, issue of the "Bulletin d'Information Scientifiques et Techiques," the assembly also comprises a top neutron shield plug which is added to the three pin bundles.

Both of the arrangements referred-to above have a drawback which arises from the fact that the pressure drop to which the coolant is subject within the fuel assembly takes place as said coolant flows through the central bundle of fissile pins which are of smaller diameter than the fertile pins forming part of the top and bottom

2 bundles. The expansion chambers, the length of which in each case is approximately one-half that of each pin, are therefore responsible for an appreciable proportion (approximately one-third in the case of an assembly consisting of three superposed bundles) of the total pressure drop sustained by the coolant within the assembly. In other words, since the delivery head of the pumps for circulating the reactor coolant is mostly employed for the purpose of overcoming the pressure drop which occurs as the coolant flows through the fuel assemblies, approximately one-quarter of the delivery head referred-to is required for the extension chamber alone. In point of fact, since no heat is released at this point, it is unnecessary to provide for the same coolant flow rate as that which exists at the level of the fissile material.

The present invention is directed to the construction of a fuel assembly which meets practical requirements more effectively than comparable assemblies of the prior art, especially insofar as it removes or at least circumvents the disadvantage mentioned above.

To this end, the fuel assembly in accordance with the invention, of the type comprising at least one bundle of pins loaded with fissile material, provided with expansion chambers and disposed in a tubular box constituting a coolant circulation duct, is primarily characterized in that said pins are divided into two sections of which the expansion chambers are disposed at opposite ends whilst the portions of all the pins which are loaded with fissile material are located at the same level.

In a preferred embodiment of the invention, one section of pins which are placed at the center of said bundle and another section consisting of the remaining pins which are placed between the central pins and the box are so arranged that their expansion chambers are located at opposite ends of the can, the portion of all of said pins which is loaded with fissile material being located at the same level.

A fuel assembly in accordance with the invention will now be described by way of non-limitative example, reference being made to FIGS. 1 and 2 of the accompanying drawings, which are views in elevation of the top portion and bottom portion of an assembly as shown in cross-section along the vertical mid-plane.

The assembly which is shown in FIGS. 1 and 2 comprises a box containing on the one hand a central bundle of pins which are loaded with fissile material and occupy the entire cross-sectional area of the box and, on the other hand, a top bundle 12 and a bottom bundle 14 of pins which are loaded with fertile material. The box is constituted by a tubular sleeve 16 of hexagonal cross-sectional configuration, the bottom and top ends of which are respectievly secured to a massive end-fitting 18 pierced by a coolant inlet 20 and to a lifting head 22 pierced by coolant outlets 24.

The pins which make up the bottom bundle 14 and top bundle 12 are disposed on a triangular lattice. Said pins are supported respectively on rails 30 which are fixed to the bottom end-fitting 18 and on a grid 32 which is rigidly fixed to the sleeve 16. The upper ends of the pins of these two bundles are respectively guided by means of grids 36 and 38.

Contrarily to the central bundle, the bottom bundle 14 and top bundle 12 only occupy an annular zone of the box which is defined by the sleee and leaves free a central passageway.

The pins of the central bundle, which are of smaller diameter than those of the top bundle 12 and bottom bundle 14, are also disposed on a triangular lattice. Each pin of the central bundle has a first portion which is loaded with fissile material (for example in the form of a stack of oxide pellets) and which takes up substantially one-half the length of the can, and a second portion which is separated from the first by a neck 42 and constitutes an expansion chamber in which the fission gases collect. In the form of construction which is illustrated, the expansion chambers are of greater length then the pins of the top bundle 12 and bottom bundle 14.

In accordance with the invention, the pins of the central bundle are divided into two sections or sub-assemblies 10*a* and 10*b*. A first section or sub-assembly 10*a*, which occupies the central portion of the bundle and has a cross-sectional area corresponding to that of the central passageway which is left free by the top bundle 12 and bottom bundle 14, is composed of pins whose expansion chamber is located above the portion which is loaded with fissible material. Said pins are suspended from rails 40 which are secured to the lifting head 22.

In order to permit of free expansion, the pins of said sub-assembly 10*a* are simply guided by the pins of the second sub-assembly 10*b* and by the pins of the top bundle 12 whilst the lower ends thereof are left free.

The second sub-assembly 10*b* is made up of the remainder of the pins of the central bundle and the expansion chambers of this section are placed beneath the portion containing fissile material. These pins are suspended from the grid 32 and are guided at their lower ends by the grid 36. Thus, in the case of all the pins forming part of the central bundle, the portion which is loaded with fissile material is located at the same level whilst the expansion chambers extend vertically on each side.

The circulation of the coolant within an assembly of this type is apparent from the figures. The coolant which is admitted in the direction of the arrows *f* through the inlets 20 flows up through the bottom end-fitting. The greater part of the flow passes upwardly within the central portion which is delimited by the pins of the bottom bundle 14 and the expansion chambers of the bundle sub-assembly 10*b*, thus by-passing said bottom bundle and said expansion chambers from which only a relatively small amount of heat is released. The flow is then distributed between the necked portions of the sub-assembly 10*b* and cools in a uniform manner the portions loaded with fissile material of the pins which form part of two sub-assemblies 10*b* and 10*a* of the central bundle. At the level of the grid 32, the greater part of the flow escapes laterally into the top bundle 12 which (by reason of the larger diameter of the top-bundle pins) affords a lower pressure drop coefficient than the sub-assembly 10*a* of the central bundle. It is therefore clear that only a small proportion of the total flow within the assembly irrigates the expansion chambers and that the pressure drop is considerably reduced by the presence in parallel of a duct which has a large cross-sectional area.

A large number of alternative forms of execution of the invention may evidently be contemplated. In particular, the arrangement of the expansion chambers can be reversed; at the price of non-identity of the top and bottom bundles, the bottom bundle can take up the total cross-sectional area of the box; the expansion chambers can be arranged in a different alternate relation (for example, in a staggered array or in lines). Finally, the assembly can comprise a central support structure of the type described in French patent application No. PV 86,219 in respect of "Nuclear fuel assembly."

What I claim is:

1. In a nuclear fuel assembly comprising a tubular box for circulation of a fluid coolant along a direction generally along the axis of said box, at least one bundle or pins in said box parallel to said direction, each pin of said bundle having a can, a fissile material body in part of the length of said can and a gas collection chamber defined by the remainder of the length of said can, said pins being so located that the fissile material bodies are at the same level along said direction, the improvement consisting of said pins of said bundle being disposed in two sub-assemblies, said gas collection chambers of the pins of one of said sub-assemblies being located at a level different from that of the gas collection chambers of the pins of the other of said sub-assemblies.

2. A fuel assembly in accordance with claim 1, wherein the gas collection chamber of each pin is located in one of the end portions of the can of said pin.

3. A fuel assembly in accordance with claim 2, wherein one of the said sub-assemblies of pins is placed at the centre of said bundle and the other sub-assembly of pins is placed between the pins of the first sub-assembly and the box.

4. A fuel assembly in accordance with claim 3, wherein said fuel assembly additionally comprises two end bundles of pins loaded with fertile material and placed on each side of said bundle of pins which are loaded with fissile material, and said gas collection chambers of said central sub-assembly occupy a central space which is left free by the pins of one of the end bundles.

5. A fuel assembly in accordance with claim 4, wherein the two end bundles occupy an annular zone defined by the box and surrounding a central space having a cross-sectional substantially equal to the cross-section of said central sub-assembly.

6. A fuel assembly in accordance with claim 1, wherein each can is formed with a neck located between the portion which is loaded with fissile material and the gas collection chamber.

References Cited

UNITED STATES PATENTS

| | | | |
|---|---|---|---|
| 3,135,665 | 6/1964 | Koutz et al. | 176—37X |
| 3,146,173 | 8/1964 | Fortescue et al. | 176—37X |
| 3,197,381 | 7/1965 | Blake | 176—78X |
| 3,207,670 | 9/1965 | Fortescue et al. | 176—78X |
| 3,231,476 | 1/1966 | Thome | 176—37X |
| 3,274,070 | 9/1966 | Vanslager | 176—37X |

BENJAMIN R. PADGETT, Primary Examiner

M. J. SCOLNICK, Assistant Examiner

U.S. Cl. X.R.

176—68, 37